US010069810B2

(12) United States Patent
Mooij et al.

(10) Patent No.: US 10,069,810 B2
(45) Date of Patent: Sep. 4, 2018

(54) ENABLING A CONTENT RECEIVER TO ACCESS ENCRYPTED CONTENT

(71) Applicant: IRDETO B.V., Hoofddorp (NL)

(72) Inventors: Wim Mooij, Hoofddorp (NL); Graham Kill, Hoofddorp (NL); Chunming Qie, Beijing (CN); Michiel Willemsen, Hoofddorp (NL)

(73) Assignee: IRDETO B.V., Hoofddorp (NL)

( * ) Notice: Subject to any disclaimer, the term of this patent is extended or adjusted under 35 U.S.C. 154(b) by 290 days.

(21) Appl. No.: 14/779,227

(22) PCT Filed: Mar. 18, 2014

(86) PCT No.: PCT/EP2014/055426
§ 371 (c)(1),
(2) Date: Sep. 22, 2015

(87) PCT Pub. No.: WO2014/154535
PCT Pub. Date: Oct. 2, 2014

(65) Prior Publication Data
US 2016/0050190 A1    Feb. 18, 2016

(30) Foreign Application Priority Data

Mar. 28, 2013 (GB) .................................. 1305734.4

(51) Int. Cl.
*H04L 29/06* (2006.01)
*H04L 12/28* (2006.01)
(Continued)

(52) U.S. Cl.
CPC ............ *H04L 63/062* (2013.01); *G06F 21/10* (2013.01); *H04L 9/083* (2013.01);
(Continued)

(58) Field of Classification Search
CPC ... H04L 63/062; H04L 9/083; H04L 12/2803; G06F 21/10; H04N 21/4408;
(Continued)

(56) References Cited

U.S. PATENT DOCUMENTS

2005/0182931 A1* 8/2005 Robert .................... G06F 21/10
                                                          713/168
2006/0123246 A1* 6/2006 Vantalon ................ H04N 5/913
                                                          713/189
(Continued)

FOREIGN PATENT DOCUMENTS

CN             101084674 A      12/2007

OTHER PUBLICATIONS

International Search Report and Written Opinion cited in corresponding International Application No. PCT/EP2014/055426 dated Jun. 24, 2014.
(Continued)

*Primary Examiner* — Jeffrey C Pwu
*Assistant Examiner* — William A Corum, Jr.
(74) *Attorney, Agent, or Firm* — Rimon, P.C.; Marc S. Kaufman (57) ABSTRACT

There is described a method of enabling a content receiver to access encrypted content, the content receiver forming part of a home network. The method comprises executing, on a device that also forms part of the home network, a key provisioning application. The method further comprises the key provisioning application receiving a key provisioning message and, based on the key provisioning message, providing to the content receiver via the home network one or more content decryption keys for decrypting the encrypted content. There is also described a device arranged to carry out this method. In addition, there is described a content receiver arranged to (a) receive from the aforementioned
(Continued)

device, via a home network, one or more content decryption keys for accessing encrypted content; and (b) decrypt encrypted content using the one or more content decryption keys. Related computer programs and computer readable mediums are also described.

21 Claims, 7 Drawing Sheets

(51) Int. Cl.
| | | |
|---|---|---|
| *H04N 21/41* | (2011.01) | |
| *H04N 21/418* | (2011.01) | |
| *H04N 21/436* | (2011.01) | |
| *H04N 21/4405* | (2011.01) | |
| *H04N 21/4623* | (2011.01) | |
| *H04N 21/6334* | (2011.01) | |
| *H04L 9/08* | (2006.01) | |
| *H04N 21/4408* | (2011.01) | |
| *H04N 21/4627* | (2011.01) | |
| *G06F 21/10* | (2013.01) | |

(52) U.S. Cl.
CPC ..... *H04L 12/2803* (2013.01); *H04N 21/4126* (2013.01); *H04N 21/4181* (2013.01); *H04N 21/43615* (2013.01); *H04N 21/4405* (2013.01); *H04N 21/4408* (2013.01); *H04N 21/4623* (2013.01); *H04N 21/4627* (2013.01); *H04N 21/6334* (2013.01); *H04N 21/63345* (2013.01)

(58) Field of Classification Search
CPC ........... H04N 21/4627; H04N 21/6334; H04N 21/4623; H04N 21/63345; H04N 21/4126; H04N 21/4181; H04N 21/43615; H04N 21/4405

See application file for complete search history.

(56) References Cited

U.S. PATENT DOCUMENTS

| | | | | |
|---|---|---|---|---|
| 2012/0060031 | A1* | 3/2012 | Huang | ............... H04L 9/083 713/168 |
| 2013/0074168 | A1* | 3/2013 | Hao | .............. H04L 9/3213 726/7 |
| 2015/0382044 | A1* | 12/2015 | Cho | ............... H04N 21/433 725/25 |

OTHER PUBLICATIONS

Diaz-Sanchez et al., "Extended DLNA protocol: Sharing protected pay TV contents", 2010 Digest of Technical Papers / International Conference on Consumer Electronics, Jan. 9, 2010, pp. 321-322.

Diaz Sanchez et al. "Sharing conditional access modules through the home network for pay TV access", IEEE Transactions on Consumer Electronics, vol. 55, No. 1, Feb. 1, 2009, pp. 88-96.

Tunstall et al., "Inhibiting Card Sharing Attacks", Advances in Information and Computer Security Lecture Notes in Computer Science, Jan. 1, 2006, pp. 239-251.

Moon et al., "A Dynamic Conditional Access System for IPTV Multimedia Systems", Systems and Networks Communications, Fourth International Conference, Sep. 20, 2009, pp. 224-229.

Chinese Office Action (English Translation) for Chinese Application No. 201480018848.5 dated Jan. 31, 2018, 14 pages.

* cited by examiner

ENABLING A CONTENT RECEIVER TO ACCESS ENCRYPTED CONTENT

The present application is the United States national stage of International Application No. PCT/EP2014/055426, filed Mar. 18, 2014 and claims priority to European Patent Application No. 1305734.4, filed Mar. 28, 2013, the entire contents of which are incorporated herein by reference.

FIELD OF THE INVENTION

The present invention relates to enabling a content receiver to access encrypted content. Associated methods, devices, content receivers, computer programs and computer readable mediums are described.

BACKGROUND OF THE INVENTION

Figure 1:
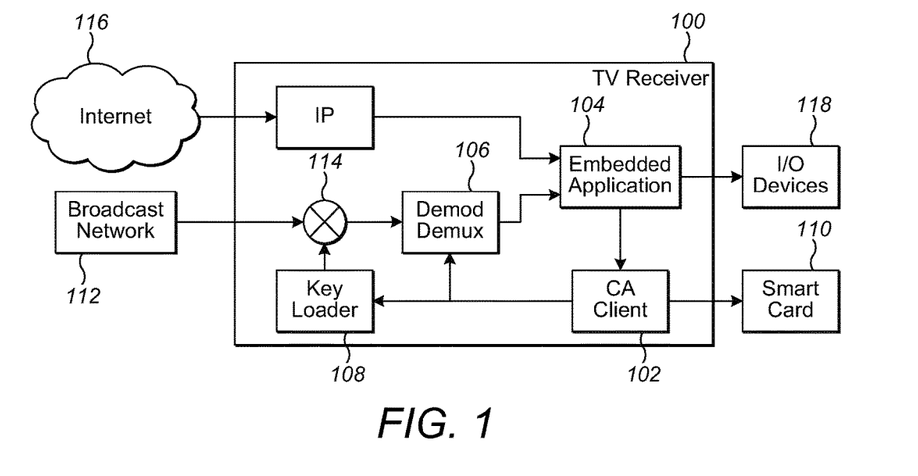
FIG. 1 schematically illustrates a typical TV receiver architecture supporting multiple TV delivery infrastructures.

Television services now routinely are delivered over both (digital) broadcast network infrastructures and point-to-point communication infrastructures. Hence, a wide range of devices are being used to consume digital television content. A typical TV receiver architecture supporting multiple TV delivery infrastructures is shown in FIG. 1. In particular, the TV receiver 100 is arranged to receive a scrambled data stream from a broadcast network 112 and/or to receive an IP TV stream from the internet 116.

The TV receiver 100 of FIG. 1 has a conditional access (CA) client application 102 with an Application Programming Interface (API, not shown) that connects to an embedded application 104 and to various hardware resources in the TV receiver 100 such as a de-modulator and a de-multiplexer (jointly depicted using reference numeral 106), and a key loader 108. Input/Output (I/O) devices 118 may be used to communicate with the embedded application 104. The API of the CA client 102 can also connect to a smart card 110 coupled to the TV receiver. The smart card 110 implements the key management functions for a specific CA system. These systems are well known. A fairly extensive description of a Conditional Access System is given in EP2334070, the entire contents of which are incorporated herein by reference. Importantly, existing devices have a fixed CA client and updating this software is difficult. Some standards and specifications are available that enable downloadable CA client applications that execute in a virtual machine, but these specifications have not found widespread adoption. The CA client typically processes its CA data (commonly called EMM and ECM streams) from the broadcast signal (so-called in-band CA signalling), where an EMM is an Entitlement Management Message and an ECM is an Entitlement Control Message. So-called out-of-band signalling is known from CA systems operating in a Cable Television network. Here a separate carrier is used to transmit CA data.

The CA client 102 sends an ECM message to the smart card 110. The smart card decrypts the ECM to obtain the control word (CW) and uses the CA client to securely send the CW via the key loader 108 for use by the descrambler 114 of the TV receiver 100. EP2461534, the entire contents of which are incorporated herein by reference, describes a public key based key loader. It also describes other well known key loaders based on symmetric key cryptographic algorithms and that relies on a secret key in the key loader module.

Security systems for content delivery over the internet have traditionally used a fixed content key that is delivered in an encrypted digital content rights container and that is associated with the encrypted digital content file. After the initial delivery, it is not necessary to contact the digital content rights server for later accesses to the encrypted content. These systems also may benefit from using a key loader as described in PCT/EP2011/069263, the entire contents of which are incorporated herein by reference.

The present invention aims to provide an alternative method for enabling a content receiver (e.g. TV received 100) to access encrypted content.

SUMMARY OF THE INVENTION

According to a first aspect of the present invention, there is provided a method of enabling a content receiver to access encrypted content, the content receiver forming part of a home network, the method comprising: (a) executing, on a device that also forms part of the home network, a key provisioning application; and (b) the key provisioning application receiving a key provisioning message and, based on the key provisioning message, providing to the content receiver via the home network one or more content decryption keys for decrypting the encrypted content.

In some embodiments, the key provisioning message comprises key provisioning data, the content decryption keys being derivable from the key provisioning data. In another embodiment, the key provisioning application obtains key provisioning data from a server based on the key provisioning message, the content decryption keys being derivable from the key provisioning data. In an alternative embodiment, the key provisioning application obtains key provisioning data from another device in the home network based on the key provisioning message, the content decryption keys being derivable from the key provisioning data. In a further alternative embodiment, the key provisioning application obtains key provisioning data stored on the device based on the key provisioning message, the content decryption keys being derivable from the key provisioning data.

The four alternative embodiments described above relate to different ways and means to obtain key provisioning data in the method of the first aspect. In each case, the content decryption keys are derivable from the key provisioning data. The key provisioning data may comprise a content certificate for use in Digital Rights Management. Alternatively, the key provisioning data may comprise an entitlement control message. In this case, the one or more content decryption keys may comprise one or more control words.

It is envisaged that the key provisioning data could be processed in a number of different ways, either by the device itself or on another device, in order to obtain the content decryption keys. In one embodiment, the key provisioning application derives the one or more content decryption keys from the key provisioning data, and the key provisioning application provides the derived content decryption keys to the content receiver via the home network. In another embodiment, the key provisioning application obtains the one or more content decryption keys by using a further device in the home network to derive the one or more content decryption keys from the key provisioning data, and wherein the key provisioning application provides the obtained content decryption keys to the content receiver via the home network. In this case, the further device may be a second content receiver operably connected to a smart card, the smart card being arranged to derive the one or more content decryption keys from the key provisioning data.

The derivation of the one or more content decryption keys from the key provisioning data may use a cryptographic key.

It is envisaged that the cryptographic key could be obtained in a number of different ways. For example, the cryptographic key may be derivable from an entitlement management message. In one embodiment, the cryptographic key is derivable from the key provisioning message. In another embodiment, the key provisioning application obtains the cryptographic key from a server based on the key provisioning message. In an alternative embodiment, the key provisioning application obtains the cryptographic key from another device in the home network based on the key provisioning message. In a further alternative embodiment, the cryptographic key is stored on the device, and the key provisioning application obtains the cryptographic key based on the key provisioning message.

Optionally, the method further comprises the device obtaining the key provisioning application from a server.

Optionally, the key provisioning application detects the presence of one or more content receivers in the home network, the one or more content receivers including the content receiver to which the one or more content decryption keys are provided.

Optionally, the key provisioning application detects the presence of one or more additional devices in the home network on which additional key provisioning applications are executing.

Optionally, the one or more content decryption keys are provided to the content receiver in an encrypted format.

In one embodiment, the key provisioning application receives the key provisioning message from the content receiver. In an alternative embodiment, the key provisioning application receives the key provisioning message from another device which forms part of the home network.

Optionally, the device is one of a mobile telephone, a tablet computer, a laptop computer, or a personal computer.

Optionally, the content receiver is a television or a set top box.

According to a second aspect of the present invention, there is provided a device arranged to carry out a method according to the first aspect.

According to a third aspect of the present invention, there is provided a content receiver arranged to: (a) receive from a device according to the second aspect, via a home network, one or more content decryption keys for accessing encrypted content; and (b) decrypt encrypted content using the one or more content decryption keys.

Optionally, the content receiver is further arranged to detect the presence of one or more devices in the home network on which key provisioning applications are executing.

According to a fourth aspect of the present invention, there is provided a computer program which, when executed by a processor, causes the processor to carry out a method according to the first aspect.

According to a fifth aspect of the present invention, there is provided a computer readable medium storing a computer program according to the fourth aspect.

Other preferred features of the present invention are set out in the appended claims.

BRIEF DESCRIPTION OF THE DRAWINGS

Embodiments of the present invention will now be described by way of example with reference to the accompanying drawings in which.

DETAILED DESCRIPTION OF PREFERRED EMBODIMENTS

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

Introduction

WO2012/123017, the entire contents of which are incorporated herein by reference, describes a Digital Living Network Alliance (DLNA) proxy software component that is active in one of the devices in the home network and that acts as a bridge between a resource server on the internet and the DLNA devices in the home network. UK patent application no. 1305686.6, the entire contents of which are incorporated herein by reference, describes a system to provide a browser based device control and electronic program guide for Digital Content Receivers (DCRs) such as set top boxes and television sets. Both patent applications are based on internet protocols and consumer electronics protocols, which are relevant for this description as well.

EP2227015, the entire contents of which are incorporated herein by reference, describes a secured software application that implements the smart card functionality. The secured application executes in the DCR or the Set Top Box (STB) and uses a similar CA client API for accessing hardware resources in the device.

Mobile devices such as mobile phones, tablet computers and similar portable gadgets are well known. Such devices often have a store from which software applications for the device can be easily downloaded. The same store provides a user-friendly way of upgrading an already installed application program (sometimes referred to as 'app'). There now are application stores with hundreds of thousands of different apps.

Existing televisions and similar DCRs (such as STBs or TV players) have a need to easily support a wide range of Digital Rights Management (DRM) and CA systems. This can be quite complicated and it can be difficult to provide simultaneous support for more than one CA system or more than one DRM system.

Even for a single CA system, an operator needs to distribute smart cards to its subscribers. If an operator wants to provide new functionality in existing devices or wants to support new devices, the CA client may need to be upgraded. Such an upgrade is often difficult to make as embedded software often is not well maintained.

In some cases, the operator may wish to upgrade the functionality of the smart card. Sometimes this is possible with a smart card code update which only introduces some operational complexity. In rare cases, the operator needs to replace the entire smart card with a new smart card with new software.

In case the operator uses a secured software implementation of the smart card functionality, an upgrade of only the smart card functionality results in updating the entire embedded firmware software, which often is quite hard.

Overview

According to the present invention, it is possible to unlock protected or encrypted content in a DCR (e.g. TV receiver) using keys received from a key provisioning application executing on a mobile device connected to the home network of the DCR. This can be used for both IP TV and broadcast TV distribution of encrypted content. The concept is useful for both DRM and CA system suppliers. It needs support in the receivers as well. It will be appreciated that the term "mobile device" as used throughout this specification refers to any device which forms part of the home network of the DCR ion question. The device may be "mobile" (e.g. a smart phone or tablet) or may be a desktop PC or other similar device.

In a variant the key provisioning application implements the smart card functionality and uses the same I/O commands as used on the smart card interface but encapsulated into a DLNA/Universal Plug and Play (UPnP) control command (a Simple Object Access Protocol (SOAP) message to send and receive data).

In another variant, the key provisioning application in the mobile device uses a DLNA/UPnP control command (a SOAP message) to send the content decryption key to the DCR. Other communication protocols also are possible. There is a preference for techniques that enable the device to work together as long as the mobile device and the DCR are in reasonably close proximity.

The key provisioning application can be installed on multiple mobile devices (or other devices in the home network) in the same household, sharing a single subscription but possibly with different access rights installed on different applications. The operator can use a web server to allow the subscriber to manage the access rights configurations of the various key provisioning applications as used in a household.

There are many variants that differ in the way that the key provisioning application interacts with the DCR and how the application obtains the keys that it provides to the receiver.

Embodiments

Figure 11:
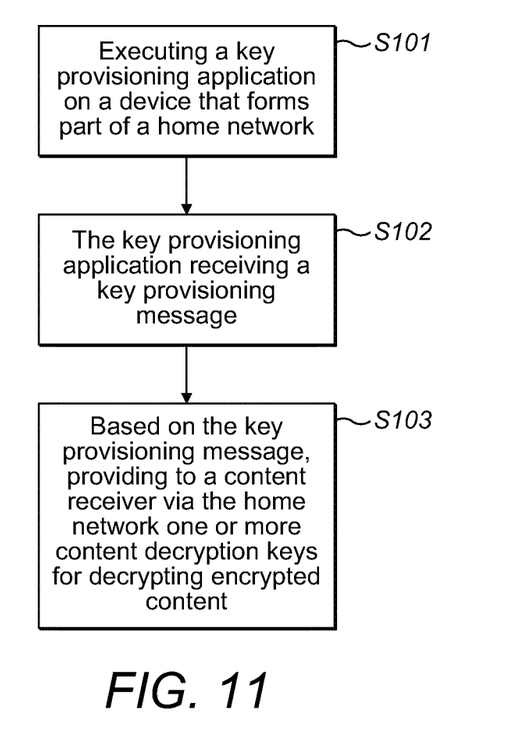
FIG. 11 schematically illustrates a method of enabling a content receiver to access encrypted content in accordance with the present invention.

The present invention provides a method of enabling a content receiver to access encrypted content. The content receiver forms part of a home network. As illustrated schematically in FIG. 11, the method comprises, at step S101, executing, on a device that also forms part of the home network, a key provisioning application. At step S102, the method further comprises the key provisioning application receiving a key provisioning message. At step S103, the method further comprises, based on the key provisioning message, providing to the content receiver via the home network one or more content decryption keys for decrypting the encrypted content.

Figure 2:
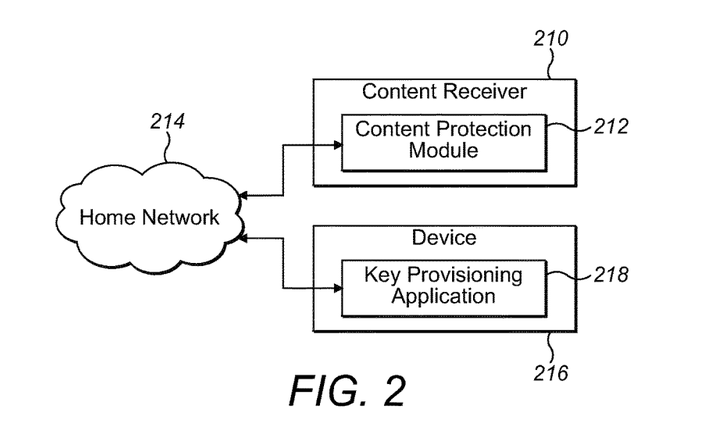
FIG. 2 schematically illustrates a system including a content receiver and a device both connected to a home network, the system being an exemplary system for use in a method of enabling the content receiver to access encrypted content in accordance with a first embodiment of the invention.

An exemplary system for use in the above method is schematically illustrated in FIG. 2. The content receiver 210 is connected to the home network 214, thereby forming part of the home network 214. The content receiver 210 may be a DCR such as a television or a STB. The other device 216 also forms part of the home network 214. The device 216 may be a mobile device such as a mobile telephone, a smart phone, a tablet computer or a laptop computer. Alternatively, the device 216 may be a desktop computer or a personal computer. The device 216 is configured for execution of the key provisioning application 218. The device 216 is able to communicate with the content receiver 210 over the home network 214 (e.g. using a communication protocol and an associated API). In FIG. 2, the home network 214 enables communication between a content protection module 212 of the content receiver 210 and the key provisioning application 218 of the device 216.

The content protection module 212 is typically included in the content receiver 210 during manufacturing. Some content receivers may have a firmware update mechanism that may be used to provide a suitable API for connection to the key provisioning application. The content protection module 212 of the content receiver 210 may contain different components based on the content protection system used and based on the functionality required by the key provisioning application 218. For simplicity, many components (e.g. APIs) are not shown in FIG. 2 or the subsequent Figures.

The communication interface can use any suitable communication protocol that is supported by the home network 214 and the devices 210 and 216 involved in the communication. Typically, the data exchange will use IP networking. The communication also can adopt SOAP control messages as used in the UPnP and DLNA specifications.

The key provisioning application 218 may be installed by the end-user using the application management infrastructure for the device 216. It may be pre-configured in the device 216 or it may be part of an application download and installation infrastructure from which the end-user can install selected applications. For example, the key provisioning application 218 may be obtained from a server (e.g. by downloading the key provisioning application as an app from the server). The key provisioning application 218 is typically made available by an encrypted content distributor for IP-based television services or broadcast-based television services. The key provisioning application 218 may be produced by a CA system supplier or a DRM system supplier. The examples described herein generally relate to CA client embodiments. However, it will be appreciated that DRM client embodiments are equally possible in all cases.

The key provisioning application 218 of FIG. 2 derives the content decryption keys based only on local information. For example, the key provisioning message received by the key provisioning application 218 may itself include key provisioning data from which the content decryption keys are derivable. In a CA client example, the key provisioning data comprises an ECM. The key provisioning message may further comprise an EMM. If the key provisioning application 218 has the appropriate entitlements (e.g. as specified by the EMM), then it may derive the one or more content decryption keys (e.g. comprising one or more CWs) from the key provisioning data (i.e. from the ECM). Thus, in a basic embodiment, the key provisioning application 218 receives the ECM and EMM, performs processing, and returns associated CWs to the content receiver 210. In one embodiment, derivation of the one or more content decryption keys (CWs) from the key provisioning data (ECM) uses a cryptographic key to specify the appropriate entitlements. The cryptographic key may be derivable from the EMM. The cryptographic key may be derivable from the key provisioning message. Alternatively, the cryptographic key may be stored on the device 216 in a memory or data store. In this case, the key provisioning application 218 may obtain the stored cryptographic key from the memory or data store based on the received key provisioning message.

In another example where the key provisioning application 218 generates the content decryption keys based only on local information, the key provisioning data may be stored on the device 216 in a memory or data store (not shown). In this example, the key provisioning application 218 may obtain the stored key provisioning data based on the received key provisioning message, such that the content decryption keys may then be derived from the key provisioning data.

Notably, in the embodiments described above, the key provisioning data is processed locally by the device 216. In other words, the processing is done as part of the key provisioning application 218. Thus, the device 216 may include a suitable processor (not shown).

The content protection keys may be provided to the content receiver 210 in encrypted format. In this case, the content protection module 212 of the content receiver will have the capability to securely decrypt the content protection keys prior to decryption of the encrypted content.

Having received the one or more content decryption keys from the device 216 via the home network 214, the content receiver 210 is arranged to decrypt the encrypted content using the one or more content decryption keys.

Whilst FIG. 2 depicts a CA client embodiment, it will be appreciated that the system could alternatively include a DRM client that relies on the key provisioning application 218 to store content certificates and/or content decryption/encryption keys. Thus, in this DRM client embodiment, the key provisioning data comprises a content certificate for use in DRM.

Whilst only one key provisioning application 218 on a single device 216 is shown in FIG. 2, it will be appreciated that there may be multiple devices 216 in the home network, each with a respective key provisioning application 218. Alternatively/additionally, multiple key provisioning applications 218 could be provided on a single device 216. For example, there may be one key provisioning application 218 for a parent and a different key provisioning application 218 for the children in the home. Such a set-up enables a distinction to be drawn between the key provisioning available to parents and children, for example. Thus, parental control may be implemented using the described system.

The encrypted content may be provided in a broadcast stream.

From the description above, it is clear that the device 216 may require the ability to connect to the internet in some embodiments. This is illustrated schematically in FIG. 3, which extends the system of FIG. 2. In particular, a wired/wireless communication path is established between the device 216 and the internet 314 via the home network 214 and a gateway 316 between the internet 314 and the home network 214. Servers such as key server 310 and application server 312 are also internet-accessible. The device 216 can use the communication path with the internet 314 to connect to the application server 312 for installing and updating the key provisioning application 218. The device 216 may also connect to the key server 310 in some variants of the key provisioning application 218.

Figure 3:
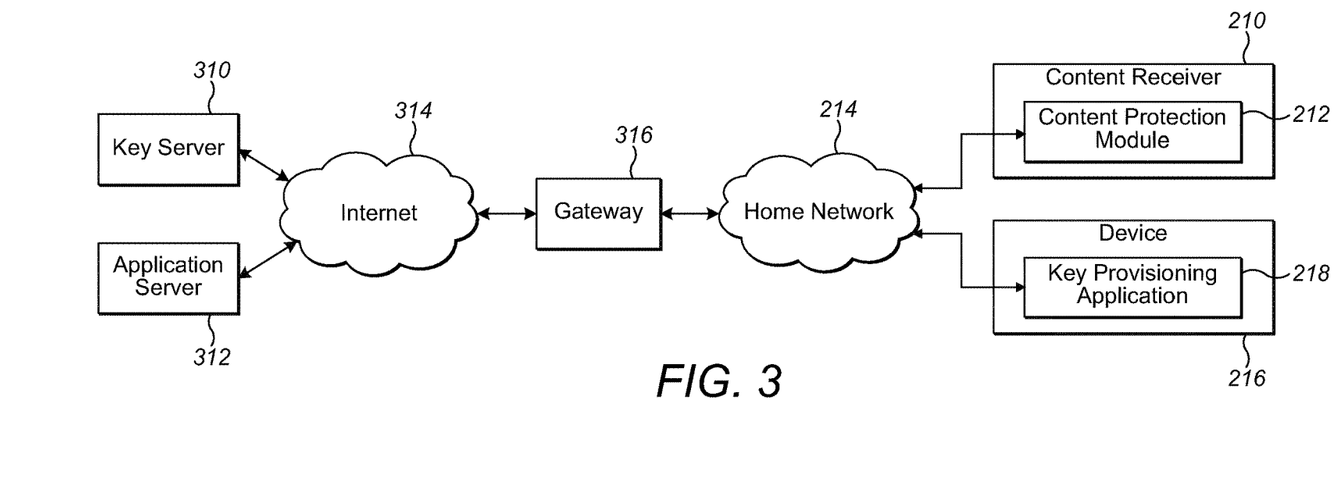
FIG. 3 schematically illustrates an extension to the system of FIG. 2 which enables the device to connect to the internet.

In the internet-accessible embodiment of FIG. 3, the key provisioning application 218 may obtain the cryptographic key from the key server 310 based on the key provisioning message. The cryptographic key may then be used to derive the one or more content decryption keys from the key provisioning data.

Figure 4:
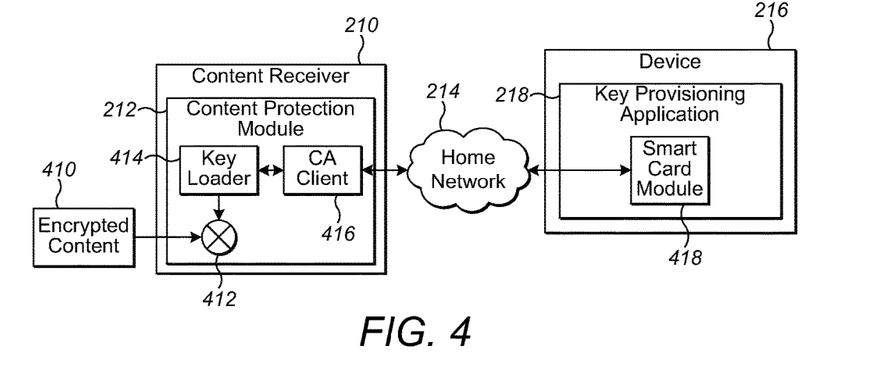
FIG. 4 schematically illustrates one example of a system in which smart card functionality can be implemented using a key provisioning application of the device connected to the home network.

Content protection for broadcast network infrastructures often uses CA systems to encrypt the content and manage the distribution of decryption keys. The Background of the Invention section above describes a typical architecture for such a system (see also FIG. 1). The CA client functionality is implanted in a smart card 110. There are variants where the smart card 110 is implemented as a secured software application executing in the content receiver (e.g. TV receiver 100). FIG. 4 schematically illustrates one example of how the smart card functionality of a CA system can be implemented using the key provisioning application 218 of the device 216 connected to the home network 214.

As shown in FIG. 4, encrypted content 410 is provided to the content receiver 210. The content protection module 212 of the content receiver 210 includes a decryption module or descrambler 412, a key loader 414 and a CA client 416. These components of the content receiver 210 are analogous to the similarly named components of the TV receiver 100 of FIG. 1. The key provisioning application 218 of the device 216 includes a smart card module 418.

The key provisioning application 218 communicates with the CA client 416 of the content protection module 212. More specifically, the CA client 416 typically uses an API to communicate with the smart card module 418 of the key provisioning application 218.

A standard content receiver, such as the TV receiver 100 of FIG. 1, has a serial communication link with the smart card 110. In one variant of the invention, this serial communication link may be adapted with a similar suitable IP based communication protocol to enable the CA client 102 to communicate with the key provisioning application 218 of the device 216. Thus, the CA client API for connection to the smart card 110 is adapted to connect to the key provisioning application 218. This has the advantage that the CA client implementation does not require any changes.

In the system of FIG. 4, the key provisioning application 218 receives a key provisioning message over the home network from the CA client 416 of the content receiver 210. Based on the received key provisioning message, the key provisioning application 218 provides to the content receiver 210 via the home network 214 the one or more content decryption keys for decrypting the encrypted content 410. Specifically, the one or more content decryption keys are received by the CA client 416 and passed to the key loader 412 for use by the descrambler 412 in decrypting the encrypted content 410. As discussed above, the key provisioning message comprises an ECM in this CA client embodiment. The key provisioning message may further comprise an EMM (or the EMM may be received in different ways as discussed above). Thus, if the key provisioning application 218 has the appropriate entitlements (e.g. as specified by the EMM), then it processes the ECM so as to obtain the one or more content decryption keys which comprise one or more CWs. Thus, again, the embodiment of FIG. 4 relates to a system in which the processing of the key provisioning message and data are carried out locally by the device 216.

In FIG. 4 and other described embodiments, the descrambler is illustrated as a hardware component of the content protection module 212 of the content receiver 210. However, it will be understood that some content receivers do not include a hardware descrambler. In such cases, it is envisaged that the functionality of the hardware descrambler 412 may be implemented in the content receiver in firmware and/or software. In this variant, the key loader 414 may also be implemented in firmware and/or software. Such software may be downloaded (via the home network 214, gateway 316 and internet 314) if not already installed on a particular content receiver.

Such software preferably includes a secured software implementation of the descrambler functionality (e.g. using obfuscation) as is known in the art. A secured implementation allows the descrambler to function securely against potential attacks, even in a whitebox attack environment. U.S. Pat. No. 6,594,761 (which is hereby incorporated by reference in its entirety) relates generally to computer software, and more specifically, to a method and system of making computer software resistant to tampering and reverse-engineering. "Tampering" occurs when an attacker makes unauthorized changes to a computer software program such as overcoming password access, copy protection or timeout algorithms. Broadly speaking, the method of U.S. Pat. No. 6,594,761 increases the tamper-resistance and obscurity of computer software code by transforming the data flow of the computer software so that the observable operation is dissociated from the intent of the original software code. This way, the attacker cannot understand and decode the data flow by observing the execution of the code. The standard use of key ladders is preferably supported by such a software implementation of the descrambler functionality. Various key ladders are described in WO2012/072703 (which is hereby incorporated by reference in its entirety). Secured software implementations also preferably involve the secure loading of a key. WO2010/146140 and WO2010/146139 (which are hereby incorporated by reference in their entirety) describe some key update mechanisms for whitebox cryptography implementations. In addition, EP2369778 (which is hereby incorporated by reference in its entirety) describes a way to load keys in a personalised descrambler, although this particular methodology requires unique firmware instances for the descrambler whilst it is preferred that the same firmware be provided to all users in the present case. Key hierachies for secured software also are described in EP2227015 (which is hereby incorporated by reference in its entirety). Whilst EP2227015 assumes that the CW is loaded into a hardware key ladder, it will be understood that a software/firmware implementation would also be possible.

In a software/firmware implementation of the descrambler, a mechanism may be used to link a key provisioning application on a particular device to one or more content receivers. International patent application PCT/CN2013/073241 (which is hereby incorporated by reference in its entirety) shows a way to use an existing DRM client for node-locking. In particular, there is described a challenge-response method for a client device. The method comprises steps of: (a) receiving challenge data, wherein the challenge data is content encrypted using an encryption key, the content including a nonce; (b) using a secured module of the client device to access the content by decrypting the challenge data using a decryption key of the secured module, the decryption key corresponding to the encryption key; (c) processing a version of the content output by the secured module so as to obtain the nonce; and (d) providing the nonce as a response. In a particular embodiment of PCT/CN2013/073241, the content is audio content, and the version of the content output by the secured module is an audible version of the content provided via a speaker of the client device. In this case, prior to the processing step, the method further comprises a step of receiving the audible version of the content using a microphone of the client device, and the processing step comprises processing the audible version of the content received by the microphone so as to obtain the nonce. The Content Decryption Module of the W3C Encrypted Media Extensions of a browser (or similar embedded media extensions) can be used to lock parts of the firmware as well. When considering content receivers in TV sets, for example, it is not necessary to use the audio feedback embodiment of PCT/CN2013/073241 since TV firmware has access to the video memory. As an option, the firmware could grab a specific part of the video memory to obtain the response from a challenge directed at a specific TV set. Additionally/alternatively, the device with the key provisioning application could request the embedded DRM client in a TV set to display a 2D barcode and scan it with a camera of the device (e.g. a mobile phone camera) to establish proximity and to verify the unique identity of the TV set.

Figure 5:
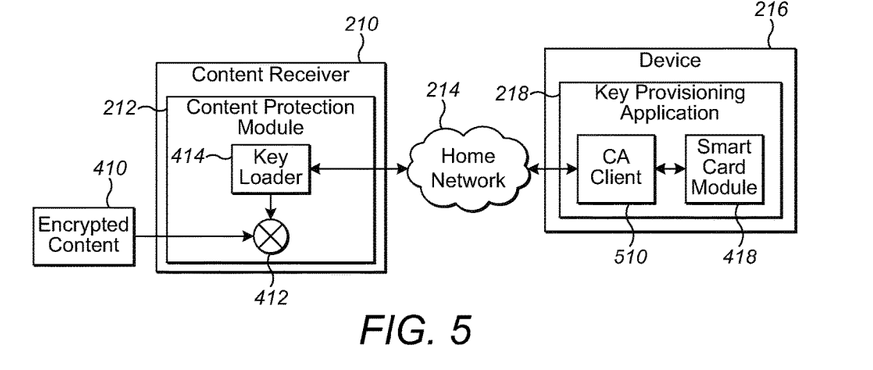
FIG. 5 schematically illustrates an exemplary system in which some of the functionality of the content receiver of FIG. 4 has been moved to the key provisioning application.

In another embodiment, some of the functionality of the content receiver 210 may be moved to the key provisioning application 218 as schematically illustrated in FIG. 5. Specifically, in the embodiment of FIG. 5, the key provisioning application 218 of the device 216 includes the CA client 510 (rather than the content receiver 210 including the CA client 416). Thus, the key provisioning application 218 uses the home network communication interface 214 to send content decryption keys (e.g. CWs) to the key loader 414 in the content protection module 212 of the content receiver 210. This embodiment uses a different API for the communication protocol between the key provisioning application 218 and the content protection module 212 as compared to previous embodiments. This key loader API supports the various key loading messages used by the key loader 412 and also supports some configuration messages. From a content receiver perspective it would be preferable to use the key loader architecture of PCT/EP2011/071435 or PCT/EP2012/052816, the entire contents of both of which are incorporated herein by reference.

Figure 6:
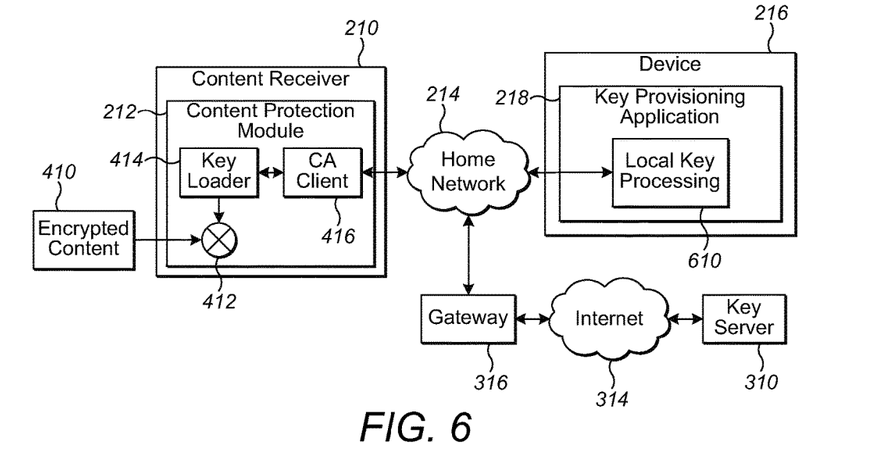
FIG. 6 schematically illustrates an alternative embodiment in which key provisioning data (from which the content decryption keys are derivable) is stored on a server such.

FIG. 6 schematically illustrates an alternative embodiment in which the key provisioning data (from which the content decryption keys are derivable) is stored on a server such as the key server 310. In this embodiment, the device 216 is able to connect to the key server 310 via the home network 214, gateway 316 and internet 314 as previously described with reference to FIG. 3. In addition, the smart card module 418 of previous embodiments has been replaced by a local key processing module 610 which forms part of the key provisioning application 418.

In the embodiment of FIG. 6, the key provisioning application 218 may obtain the key provisioning data from the key server 310 via the internet 314. The key provisioning application 218 uses the API of the CA client 216 to communicate with the content protection module 212 of the content receiver 210. The CA client 416 sends a key provisioning message in the form of an ECM decryption request to the key provisioning application 218. However, there are EMM data filters in the CA client 416. The key provisioning application 218 configures the EMM data filters in a way that does not trigger any EMM decryption requests to the key provisioning application 218. Instead, EMM data streams are sent to the key server 310 over the internet 314. The cryptographic keys transmitted in the EMM data streams are then able to be retrieved directly from the key server 310 by the key provisioning application 218 using the internet communication infrastructure. The key provisioning application 218 is then able to decrypt the received ECMs using the cryptographic keys and its local processing module 610. This decryption of the ECMs yields one or more CWs which are then sent back to the CA client via the home network 214. Note that the local key processing module 610 may need configuring with higher level keys that match keys in the key loader 414 of one or more content receivers 210 in the home network.

Thus, in this embodiment, the content receiver 210 forwards ECMs to the key provisioning application 218, and EMMs are forwarded to the key server 310. The key provisioning application 218 receives the ECMs from the content receiver 210 and obtains the necessary EMM information (i.e. the key provisioning data) from the key server 310. The key provisioning application 218 is then able to extract the CWs (content decryption keys) from the ECMs (key provisioning message) using the cryptographic keys (key provisioning data) and return the CWs to the content receiver over the home network 214.

As previously discussed, this methodology is equally applicable to DRM systems in which the key provisioning data comprises a content certificate.

Figure 7:
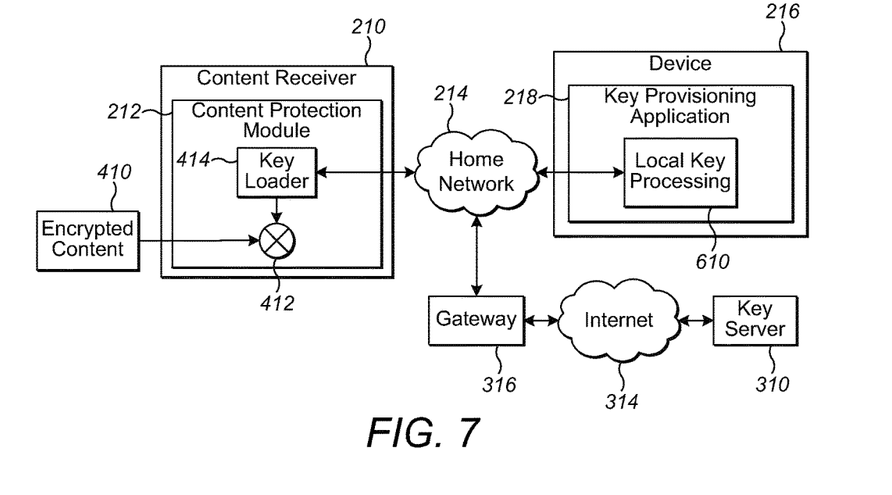
FIG. 7 schematically illustrates a further system which may be viewed simplistically as a combination of the systems shown in FIGS. 5 and 6.

FIG. 7 schematically illustrates a further system which may be seen as a combination of the systems shown in FIGS. 5 and 6. In particular, this embodiment combines the storage of key provisioning data on a key server 310 (as in FIG. 6) with the content protection module 212 which uses the key loader API (as in FIG. 5). The key loader 414 now loads content encryption keys (CEKs) and CWs that it receives from the local key processing module 610 of the key provisioning application 218. As in the previous example, the local key processing module 610 obtains the key provisioning data from EMMs or DRM content certificates stored on the key server 310. Again, this approach can be used for both DRM and CA Systems.

Optionally, the device 216 may also receive the key provisioning message (e.g. the ECM) directly from the key server 310, rather than receiving it from a CA client in the content receiver 210. In this case, the local key processing module 610 may obtain the CEKs and CWs directly from the key server 610 and use the key loader API to transmit these keys to the content protection module 212 in the content receiver 210.

In the implementation of the key provisioning application 218, it is desirable to protect data against attackers. This may be achieved by storing sensitive data such as (secret) keys and the associated cryptographic operation in a secured environment in the device 216 as shown in FIG. 8.

Figure 8:
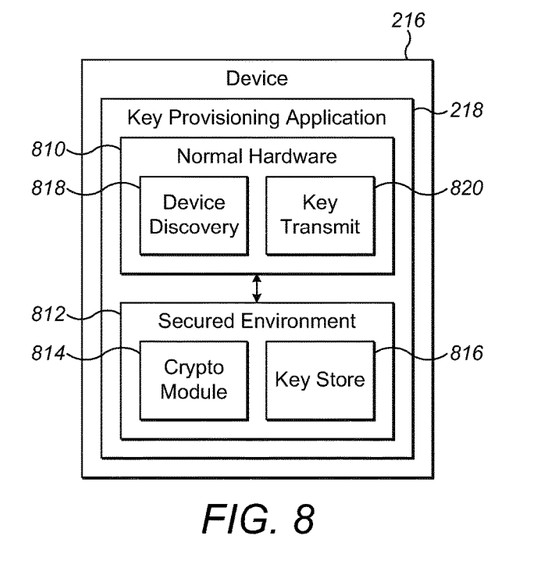
FIG. 8 schematically illustrates an exemplary device having a key provisioning application with normal hardware and a secured environment.

In FIG. 8, the key provisioning application 218 of the device 216 includes normal hardware 810 and a secured environment 812. The secured environment 812 may be a secured microprocessor in the device 216 or a smart card within the device 216 (e.g. a SIM card). The secured environment 812 may alternatively be a secure software container that protects data using software and data transformations. The secured environment includes a cryptographic module 814 and a key store 816. The normal hardware includes a device discovery module 818 and a key transmit module 820.

Any keys in the key store 816 should not be observable outside the secured environment. Hence, cryptographic operations and functions are available in the secured environment for performing any sensitive operations (see cryptographic module 814). Other functions, such as device discovery (see device discovery module 818), key transmission (see key transmit module 820) and end-user interaction execute in the normal application execution environment which is assumed to be available to attackers.

The device discovery module 818 enables the device 210 to detect the presence of content receivers 610 and other key provisioning applications 218 in the home network 214. Having detected the presence of such devices, pairing may occur between the mobile device and a detected other device. The device discovery module 818 may also be operable to check network and messaging information to restrict the discovery process to only reveal local receivers and applications (an example is the Simple Service Discovery Protocol as used in the DLNA and UPnP standards). After the basic device discovery, the device discovery module 818 may be operable to determine a mapping between discovered key provisioning applications 218 and content receivers 210. A key provisioning application 218 can serve keys to one or multiple content receivers 210.

Figure 9:
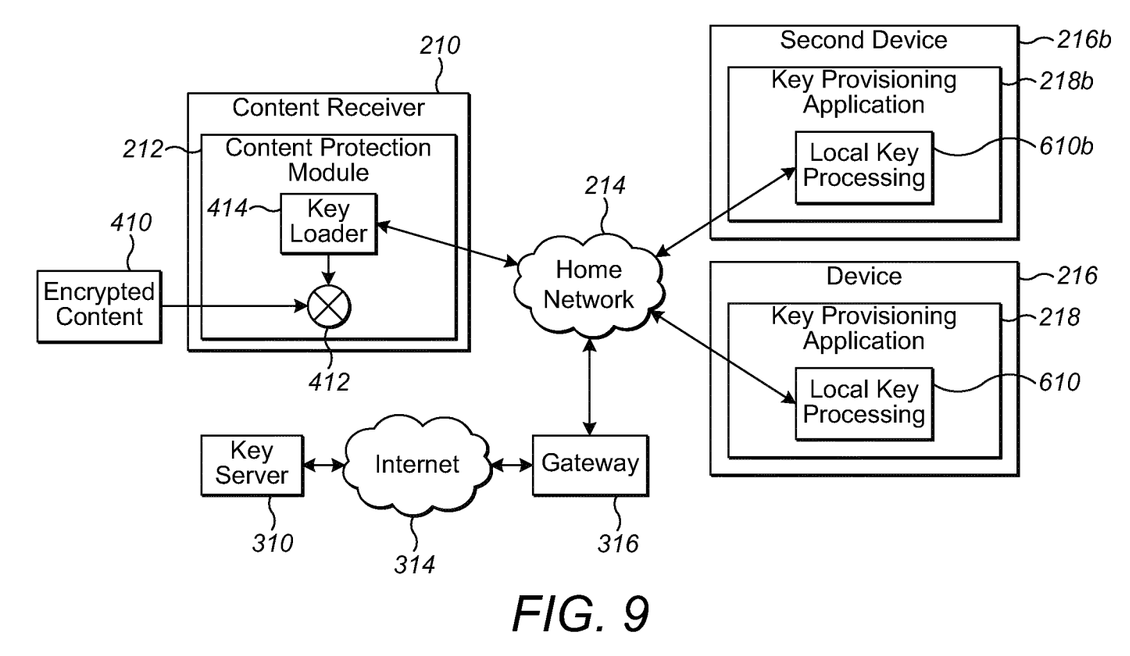
FIG. 9 schematically illustrates an exemplary system similar to that of FIG. 7 but including a second device as part of the home network. The second device may be used as a key provisioning proxy for the first device.

FIG. 9 schematically illustrates a system similar to that of FIG. 7 but including a second device 216b as part of the home network 214. The second device 216b may be similar or different to the first device 216 (i.e. the device of FIG. 7). Nonetheless, the second device 216b includes a respective key provisioning application 218b and local key processing module 610b.

The second device 216b may be used as a key provisioning proxy 216b for the first device 216. The key provisioning application 218 in the first device 216 may configure the key provisioning application 218b in the second device 216b to take over its key provisioning services for the content receiver 210 for a predetermined period of time. This offloads the processing resources and power consumption resources of the key provisioning application 218 of the first device 216 to the key provisioning application 218b of the second device 216b. After the expiry of the predetermined period of time, the key provisioning application 218 of the first device 216 may configure the content receiver 210 differently, such that it may no longer receive keys from the key provisioning proxy (i.e. the key provisioning application 218b of the second device 216b).

In this embodiment, the one or more content decryption keys obtained by the key provisioning application 218b of the second device 216b may be provided to the content receiver 210 either directly by the second device 216b itself, or indirectly via the first device 206. Direct provisioning of such keys (without reference to the first device 216) will be more efficient, but indirect provisioning of the keys will ensure that the content receiver 210 does not see any difference in key provisioning regardless of whether or not a proxy is used by the first device 216. When indirect provisioning of the keys is effected, the key provisioning application 218 obtains the one or more content decryption keys by using the second device 216b in the home network 214 to derive the one or more content decryption keys from the key provisioning data. Moreover, the key provisioning application 218 provides the obtained content decryption keys to the content receiver 210 via the home network 214.

In the embodiment of FIG. 9, the key provisioning application 218 of the first device 216 may obtain the key provisioning data (from which the content decryption keys are derivable) from the key provisioning application 218b of the second device 216b based on the key provisioning message.

In the embodiment of FIG. 9, the key provisioning application 218 may detect the presence of one or more additional devices in the home network 214 (e.g. the second device 216b) on which additional key provisioning applications are executing.

Figure 10:
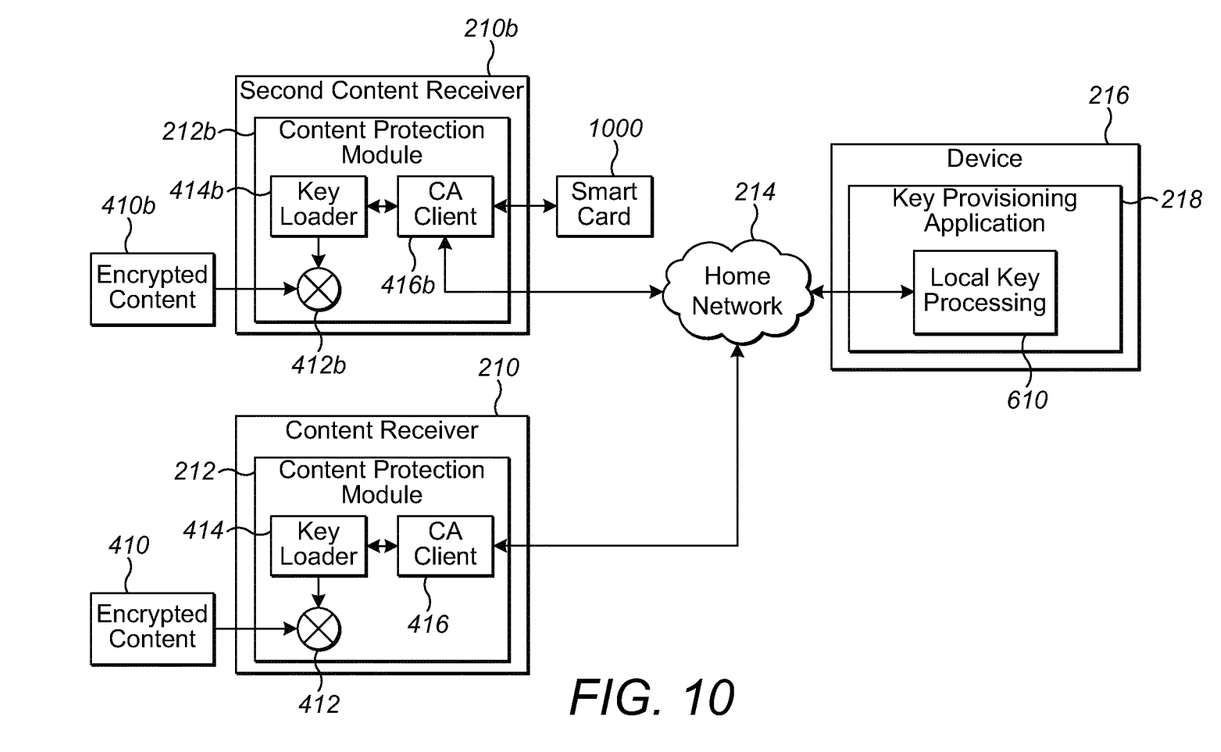
FIG. 10 schematically illustrates an exemplary system in which a key provisioning application operates as a proxy for a smart card connected to one of the content receivers in the home network.

Another embodiment concerns a key provisioning application that operates as a proxy for a smart card connected to one of the content receivers in the home network. This is schematically illustrated in FIG. 10. In FIG. 10, the system includes the content receiver 210 and device 216 operably connected via the home network 214 as before (see, e.g. FIG. 4). However the system additionally includes a second content receiver 210b connected to a smart card 1000. The second content receiver 210b also forms part of the home network 214. The second content receiver 210b may be similar or different to the first content receiver 210 (i.e. the device of FIG. 4). Nonetheless, the second content receiver 210b includes a respective decryption module or descrambler 412b, a key loader 414b and a CA client 416b.

The key provisioning application 218 may provide key provisioning services for the first content receiver 210. From the perspective of the first content receiver 210, there is no difference between this embodiment and the embodiment shown in FIG. 4. However, in this embodiment, the key provisioning application 218 obtains the one or more content decryption keys by using the second content receiver 210b to derive the one or more content decryption keys from the key provisioning data, so that the key provisioning application 218 may provide the obtained content decryption keys to the first content receiver 210 via the home network 214. Optionally, the smart card 1000 is arranged to derive the one or more content decryption keys from the key provisioning data. Optionally, the key provisioning application 218 of the first device 216 may obtain the key provisioning data (from which the content decryption keys are derivable) from the second content receiver 210b over the home network based on the key provisioning message.

In a preferred example, let us assume that we wish to enable the first content receiver 210 to decrypt the encrypted content 410. The first content receiver 210 sends an ECM (i.e. a key provisioning message including key provisioning data) over the home network 214 to the key provisioning application 218. The key provisioning application 218 forwards the ECM to the second content receiver 210b to enable the second content receiver 210b to derive the CWs (i.e. the content decryption keys) from the ECM. In particular, the second content receiver 210b uses the smart card 1000 to derive the CWs from the ECM. The CWs are then forwarded from the smart card 1000 to the key provisioning application 218 via the second content receiver 210b and the home network 214. The key provisioning application 218 then provides the content decryption keys to the first content receiver 210 via the home network 214 for decrypting the encrypted content 410. Thus, in this variant, the smart card 1000 is used for processing the key provisioning data to obtain the content decryption keys.

In one embodiment, the key provisioning application 218 may obtain the cryptographic key from the second content receiver 210b (or the smart card 1000) based on the key provisioning message. The cryptographic key is used in the derivation of the one or more content decryption keys from the key provisioning data. For example, the key provisioning application 218 may obtain an EMM from the second content receiver 210b (or the smart card 1000), and this EMM may then be used to derive the cryptographic key, thereby enabling derivation of the CWs (i.e. content decryption keys) from an ECM (i.e. the key provisioning data).

In yet another embodiment, a home network may contain multiple devices 216, each with a key provisioning application 218 that can serve keys to content receivers 210 in the home network 214. This means that each user of a key provisioning application 218 can view content on each content receiver 210 in the home network 214. An operator may provide configuration options for key provisioning applications 218 for a single home network 214. These configuration options may control which content receivers 210 that the key provisioning application 218 of a specific device 216 may access. It also may configure which key provisioning applications 218 may enable a key provisioning proxy. The configuration also can control the type of content and/or subscription packages for which the key provisioning application 218 can be enabled. In some cases, the key provisioning application 218 can be configured to provide access to pay-per-view or pay-to-own content, which also may be enabled in the configuration parameters of the key provisioning application 218. An option is that one key provisioning application 218 is configured to control the configuration settings of other key provisioning applications 218 in the home network 214. Alternatively, this can be done from a configuration server in the internet domain, which also can act as a back-up for the configuration settings for a group of key provisioning applications 218.

For initialization, it is advantageous for the content receiver 210 to support device discovery. In other words, the content receiver 210 may be arranged to detect the presence of one or more devices in the home network 214 (e.g. first and second devices 216 and 216b) on which key provisioning applications are executing. This is a matter of scanning the network and requesting key provisioning services from any of the active key provisioning applications 218. Some events such as channel changes (which are implicit in an ECM request) may be conveyed to the key provisioning application 218 that can use this notification to generate the keys for the new content stream. The meta-data in the content or the content stream may contain information regarding whether the keys can be obtained from a local key provisioning application 218. The metadata also may list the key provisioning supplier ID which helps the content receiver 210 to locate and contact the key provisioning application 218 for one of the listed suppliers. In the case of MPEG-2 DVB broadcast streams, the key provisioning supplier information can be included in the Program Map Table (PMT) preferably in on of the CA-descriptors contained in the PMT.

In summary, various CA embodiments of the key provisioning application 218 may be thought of as doing the following:

1. Receive a content decryption key request (i.e. a key provisioning message), including parameters to describe which fragment of encrypted content 410 the key is for);
2. Optionally retrieve CA data (i.e. key provisioning data);
3. Process the CA data to obtain the CW; and
4. Send the CW to the content receiver 210.

The optional step 2 has a three variants:
  a) The key provisioning application 218 retrieves all CA data from the content receiver 210;
  b) The key provisioning application 218 retrieves ECMs from the receiver and EMMs from the key server 310; or
  c) The key provisioning application 218 retrieves ECMs from the key server 310 (no EMMs needed).

The alternative to optional step 2 is that the CA data also could be embedded in the key provisioning message or stored locally in the key provisioning application 218.

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may together be implemented by a single module.

It will be appreciated that, insofar as embodiments of the invention are implemented by a computer program, then a storage medium and a transmission medium carrying the computer program form aspects of the invention. The computer program may have one or more program instructions, or program code, which, when executed by a computer carries out an embodiment of the invention. The term "program," as used herein, may be a sequence of instructions designed for execution on a computer system, and may include a subroutine, a function, a procedure, a module, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method, implemented by one or more processors, of enabling a content receiver to access encrypted content, the content receiver forming part of a home network, the method comprising:
  executing, on a mobile device that also forms part of the home network, a key provisioning application, the key provisioning application having been downloaded to the mobile device from a server; and
  the key provisioning application receiving a key provisioning message and, based on the key provisioning message, providing to the content receiver via the home network one or more content decryption keys for decrypting the encrypted content;
  wherein the key provisioning application obtains the one or more content decryption keys by using a further device in the home network, wherein the further device is a second content receiver operably connected to a smart card, the smart card being arranged to derive the one or more content decryption keys from the key provisioning data; and
  wherein one of:
  the key provisioning message comprises key provisioning data, the content decryption keys being derivable from the key provisioning data;
  the key provisioning application obtains key provisioning data from a server based on the key provisioning message, the content decryption keys being derivable from the key provisioning data;
  the key provisioning application obtains key provisioning data from another device in the home network based on the key provisioning message, the content decryption keys being derivable from the key provisioning data; and
  the key provisioning application obtains key provisioning data stored on the mobile device based on the key provisioning message, the content decryption keys being derivable from the key provisioning data.

2. The method of claim 1 wherein the key provisioning data comprises a content certificate for use in Digital Rights Management.

3. The method of claim 1 wherein the key provisioning data comprises an entitlement control message.

4. The method of claim 3 wherein the one or more content decryption keys comprise one or more control words.

5. The method of claim 1 wherein the key provisioning application derives the one or more content decryption keys from the key provisioning data, and wherein the key provisioning application provides the derived content decryption keys to the content receiver via the home network.

6. The method of claim 1 wherein the key provisioning application obtains the one or more content decryption keys by using the further device in the home network to derive the one or more content decryption keys from the key provisioning data, and wherein the key provisioning application provides the obtained content decryption keys to the content receiver via the home network.

7. The method of claim 1 wherein the derivation of the one or more content decryption keys from the key provisioning data uses a cryptographic key.

8. The method of claim 7 wherein the cryptographic key is derivable from an entitlement management message.

9. The method of claim 7 wherein the cryptographic key is derivable from the key provisioning message.

10. The method of claim 7 wherein the key provisioning application obtains the cryptographic key from a server based on the key provisioning message.

11. The method of claim 7 wherein the key provisioning application obtains the cryptographic key from another device in the home network based on the key provisioning message.

12. The method of claim 7 wherein the cryptographic key is stored on the mobile device, and the key provisioning application obtains the cryptographic key based on the key provisioning message.

13. The method of claim 1 further comprising the mobile device obtaining the key provisioning application from a server.

14. The method of claim 1 wherein the key provisioning application detects the presence of one or more content receivers in the home network, the one or more content receivers including the content receiver to which the one or more content decryption keys are provided.

15. The method of claim 1 wherein the key provisioning application detects the presence of one or more additional devices in the home network on which additional key provisioning applications are executing.

16. The method of claim 1 wherein the one or more content decryption keys are provided to the content receiver in an encrypted format.

17. The method of claim 1 wherein the key provisioning application receives the key provisioning message from the content receiver.

18. The method of claim 1 wherein the key provisioning application receives the key provisioning message from another device which forms part of the home network.

19. The method of claim 1 wherein the content receiver is a television or a set top box.

20. A mobile device comprising one or more processors arranged to enable a content receiver to access encrypted content, the content receiver and the device forming part of a home network, by:
executing, on the mobile device, a key provisioning application, the key provisioning application having been downloaded to the mobile device from a server; and
the key provisioning application receiving a key provisioning message and, based on the key provisioning message, providing to the content receiver via the home network one or more content decryption keys for decrypting the encrypted content
wherein the key provisioning application is arranged to obtain the one or more content decryption keys by using a further device in the home network, wherein the further device is a second content receiver operably connected to a smart card, the smart card being arranged to derive the one or more content decryption keys from the key provisioning data; and
wherein one of:
the key provisioning message comprises key provisioning data, the content decryption keys being derivable from the key provisioning data;
the key provisioning application obtains key provisioning data from a server based on the key provisioning message, the content decryption keys being derivable from the key provisioning data;
the key provisioning application obtains key provisioning data from another device in the home network based on the key provisioning message, the content decryption keys being derivable from the key provisioning data; and
the key provisioning application obtains key provisioning data stored on the mobile device based on the key provisioning message, the content decryption keys being derivable from the key provisioning data.

21. One or more tangible non-transitory computer readable media comprising computer program code which, when executed by a processor, causes the processor to enable a content receiver to access encrypted content, the content receiver forming part of a home network, by:
executing, on a mobile device that also forms part of the home network, a key provisioning application, the key provisioning application having been downloaded to the mobile device from a server; and
the key provisioning application receiving a key provisioning message and, based on the key provisioning message, providing to the content receiver via the home network one or more content decryption keys for decrypting the encrypted content
wherein the key provisioning application is arranged to obtain the one or more content decryption keys by using a further device in the home network, wherein the further device is a second content receiver operably connected to a smart card, the smart card being arranged to derive the one or more content decryption keys from the key provisioning data; and
wherein one of:
the key provisioning message comprises key provisioning data, the content decryption keys being derivable from the key provisioning data;
the key provisioning application obtains key provisioning data from a server based on the key provisioning message, the content decryption keys being derivable from the key provisioning data;
the key provisioning application obtains key provisioning data from another device in the home network based on the key provisioning message, the content decryption keys being derivable from the key provisioning data; and
the key provisioning application obtains key provisioning data stored on the mobile device based on the key provisioning message, the content decryption keys being derivable from the key provisioning data.

* * * * *